(12) United States Patent
Zhao

(10) Patent No.: US 10,593,914 B2
(45) Date of Patent: Mar. 17, 2020

(54) BATTERY COVER STRUCTURE FOR PORTABLE OPTICAL COMMUNICATION EQUIPMENT AND OPTICAL COMMUNICATION EQUIPMENT

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, WeiHai (CN)

( * ) Notice: Subject to any disclaimer, the term of this patent is extended or adjusted under 35 U.S.C. 154(b) by 87 days.

(21) Appl. No.: 15/901,147

(22) Filed: Feb. 21, 2018

(65) Prior Publication Data

US 2019/0067654 A1 Feb. 28, 2019

(30) Foreign Application Priority Data

Aug. 30, 2017 (CN) .......................... 2017 1 0763978

(51) Int. Cl.
*H01M 2/10* (2006.01)
*H01M 2/02* (2006.01)

(52) U.S. Cl.
CPC ...... *H01M 2/1022* (2013.01); *H01M 2220/30* (2013.01)

(58) Field of Classification Search
CPC .............. H01M 2/10; H01M 2/02; H01M 2/12
See application file for complete search history.

(56) References Cited

U.S. PATENT DOCUMENTS

| 5,631,098 | A  | * | 5/1997 | Suzuki | ............... | H01M 2/1055 |
|---|---|---|---|---|---|---|
|  |  |  |  |  |  | 429/1 |
| 2007/0205208 | A1 | * | 9/2007 | Ueda | ..................... | G03B 17/02 |
|  |  |  |  |  |  | 220/813 |
| 2011/0149144 | A1 | * | 6/2011 | Sato | ....................... | G03B 17/00 |
|  |  |  |  |  |  | 348/375 |
| 2014/0061216 | A1 | * | 3/2014 | Lee | ...................... | H05K 5/0226 |
|  |  |  |  |  |  | 220/837 |

* cited by examiner

*Primary Examiner* — Kenneth J Douyette
(74) *Attorney, Agent, or Firm* — Anova Law Group, PLLC

(57) ABSTRACT

A battery cover structure for portable optical communication equipment, comprises a shell and fixing screws, wherein the shell comprises a main body and an upper cover; the battery cover structure comprises an actuating device and a locking device, among which, the actuating device moves to drive the locking device into a locking state or an unlocking state; the actuating device comprises a driving block, a driving stop and a driving shaft, wherein the driving block is limited and connected with the driving stop; the locking device comprises a sliding stop; both the driving stop and the sliding stop are connected with the driving shaft. The battery cover structure in this invention can extend into the optical communication equipment, and support can be directly generated without cooperation of other components, so that the optical communication equipment becomes portable and miniaturized.

12 Claims, 12 Drawing Sheets

BATTERY COVER STRUCTURE FOR PORTABLE OPTICAL COMMUNICATION EQUIPMENT AND OPTICAL COMMUNICATION EQUIPMENT

CROSS-REFERENCE TO RELATED APPLICATIONS

This application claims the priority of Chinese Patent Application No. CN201710763978.7, filed on Aug. 30, 2017, the content of which is incorporated herein by reference in its entirety.

TECHNICAL FIELD

The present invention relates to the field of optical communication equipment, and in particular, to a battery cover structure for portable optical communication equipment and optical communication equipment.

BACKGROUND

In recent years, the design mainstream of optical communication equipment is gradually developing towards portability and miniaturization. In the field of optical communication equipment, batteries, as power supply elements of optical communication electronic equipment, are usually arranged inside the optical communication equipment, and the batteries arranged inside the optical communication equipment are fixed through a cover body.

At present, the common battery cover structure which can be opened and closed on the market generally adopts a sliding clamping and fixing mode. The invention under CN200710005828.6 and the title of cover opening and closing device discloses a cover opening and closing device, which comprises a container unit including a cover and a unit main body, wherein the support frame is a concave part formed at the lower part of the unit main body, and the cover is exposed on the lower surface of the camera main body. The cover is slidable between a locking position and a release position. At the locking position, the cover is adjacent to a first inner surface of the support frame; at the release position, the cover is adjacent to a second inner surface of the support frame opposite to the first inner surface. The end of the cover is provided with a rotating shaft, among which, both ends of the rotating shaft are engaged with two slim holes formed in the lateral side of the support frame, and the cover is slidably and rotatably blocked by the support frame. The invention realizes the structure of the movable opening and closing battery cover body, but the structure of the connecting part between the cover body and the shell is complex, and occupies a large space, which is not beneficial to the miniaturization design of the optical communication equipment, and in order to facilitate the opening of the cover body, the cover body needs to be arranged at the edge of the shell. Due to the single position, the design requirements of other components of the optical communication equipment cannot be met to move the design position of the battery, which affects the miniaturization design of the machine and the convenience requirements for use. Moreover, when the battery cover is opened, one side of the battery cover is connected with the shell, and not much convenience is provided for insertion and removal of the battery.

SUMMARY

The problem to be solved by the present invention is to fill the above-mentioned gaps of the prior art, to provide a low-cost, strong battery cover structure for the portable optical communication equipment that can be easily opened and closed, as well as portable optical communication equipment used with this battery cover structure.

The technical problem of the invention can be solved by the following technical proposals:

A battery cover structure for portable optical communication equipment, which comprises a shell and fixing screws, among which, the shell comprises a main body and an upper cover;

The battery cover structure comprises an actuating device and a locking device, wherein the actuating device moves to drive the locking device into a locking state or an unlocking state;

The actuating device comprises a driving block, a driving stop and a driving shaft, wherein the driving block is limited and connected with the driving stop;

The locking device comprises a sliding stop; both the driving stop and the sliding stop are connected with the driving shaft;

Further, the driving shaft comprises a first connecting groove and a second connecting groove, among which the driving stop comprises a first connecting hole, the sliding stop comprises a second connecting hole, the first connecting groove is engaged with the first connecting hole in a fitting manner, and the second connecting groove is engaged with the second connecting hole in a fitting manner; the first connection groove and the second connection groove are positioned on opposite sides of the driving shaft;

Further, the driving shaft is provided with a driving shaft connecting portion protruding and surrounding the driving shaft, and the driving shaft connecting portion is provided with driving shaft connecting portion grooves in a good fit with the first connecting hole and the second connecting hole;

Further, the driving block comprises a support frame; the driving stop is provided with a driving stop connecting portion which is matched and connected with the support frame;

The support frame is clamped into the driving stop connecting portion and flexibly connected with it. When the driving block moves, the support frame touches the driving stop connecting portion to drive the driving stop to move along with the driving block.

Further, the driving stop connecting portion comprises driving stop grooves, among which, the driving stop grooves are sunk in the driving stop to form a step portion perpendicular to the moving direction of the driving stop;

The support frame is clamped into the driving stop grooves and flexibly connected with them, when the driving block moves, the support frame touches the step portion to drive the driving stop to move along with the driving block;

Further, the driving block is provided with a driving block projection for supporting the sliding stop and a driving block supporting plate for supporting the driving stop;

The driving block projection is in contact with the lower plane of the sliding stop, the driving stop supporting plate is in contact with the lower plane of the driving stop, and the sliding stop is parallel to the driving stop in the lengthwise direction;

Further, it comprises a driving switch and the driving switch is fixedly connected with the driving block;

Further, the main body is provided with a driving switch accommodating place, and the driving switch is provided with a driving switch boss; the size of the driving switch accommodating place is larger than that of the driving switch boss, and the driving switch boss is inserted into the driving switch accommodating place and moves back and forth in the driving switch accommodating place;

Further, the driving block is provided with a driving block clamping projection and a clamping thin wall, wherein the clamping thin wall is a deformable mechanism;

The main body is provided with a main body clamping projection, wherein the driving block clamping projection can be flexibly connected with the main body clamping projection.

Further, the main body is provided with a main body driving shaft connection for accommodating the driving shaft, and the main body driving shaft connection is semicircular; the upper cover is provided with an upper cover driving shaft connection for accommodating the driving shaft, and the upper cover driving shaft connection is semicircular;

When the upper cover is closed and connected with the main body, the upper cover driving shaft connection is in contact with and closed with the main body driving shaft connection to form an annular circular hole, and the driving shaft is accommodated in the annular circular hole.

Further, the main body is also provided with a plurality of main body stop grooves through which the locking device protrudes when the locking device enters a locking state.

Further, the main body is provided with a main body stop and the actuating device is accommodated in the main body stop.

The present invention also provides another solution:

A battery cover structure for optical communication equipment, which comprises a shell and fixing screws, and the shell comprises a main body and an upper cover, and the battery cover structure comprises an actuating device and a locking device, wherein the actuating device moves to drive the locking device into a locking state or an unlocking state;

The actuating device comprises a driving block, a driving stop and a driving shaft, wherein the driving block is limited and connected with the driving stop;

The locking device comprises a sliding stop; both the driving stop and the sliding stop are connected with the driving shaft;

The main body is provided with an elastic block accommodating groove, among which, the elastic block accommodating groove accommodates an ejection portion, and the ejection portion comprises an elastic mechanism, and the elastic mechanism is positioned between the main body and the upper cover, when the battery cover structure is in an unlocking state, the elastic mechanism generates a force far away from the main body and drives the battery cover structure to eject from the main body;

Further, the elastic mechanism comprises an elastic block and a spring, wherein the elastic block is cylindrical; one end of the spring is accommodated in the cylinder of the elastic block; and the other end of the spring is in contact with the main body;

Further, the ejection portion further comprises an elastic block stop which is positioned between the elastic mechanism and the upper cover, and the ejection portion is fixedly connected with the main body through the elastic block stop;

Further, the elastic block is externally provided with an elastic block protrusion and/or groove; the elastic block protrusion and/or groove is provided with a strip-shaped protrusion and/or groove; the elastic block protrusion and/or groove are/is adapted to be connected to each other with the strip-shaped protrusion and/or groove;

Further, the driving shaft comprises a first connecting groove and a second connecting groove, among which the driving stop comprises a first connecting hole, the sliding stop comprises a second connecting hole, the first connecting groove is engaged with the first connecting hole in a fitting manner, and the second connecting groove is engaged with the second connecting hole in a fitting manner; the first connection groove and the second connection groove are positioned on opposite sides of the driving shaft;

Further, the driving block comprises a support frame; the driving stop is provided with a driving stop connecting portion which is matched and connected with the support frame;

The support frame is clamped into the driving stop connecting portion and flexibly connected with it. When the driving block moves, the support frame touches the driving stop connecting portion to drive the driving stop to move along with the driving block.

The present invention also refers to a kind of optical communication equipment, which is provided with a battery cover structure, wherein the battery cover structure is the one for the above-mentioned portable optical communication equipment.

The beneficial effects of the present invention are:

1. The battery cover structure adopted by the invention has small and stable internal structure and is not easy to be damaged during use.

2. The battery cover structure adopted by the invention enables the battery cover to extend into the optical communication equipment, and support can be directly generated without cooperation of other components. As a result, the optical communication equipment becomes portable and miniaturized.

3. The battery cover structure adopted by the invention can be ejected automatically, to avoid the difficulty with the removal of the battery cover structure trapped in the optical communication equipment, being convenient and simple to operate.

REFERENCE NUMERALS IN THE FIGURES

Figure 1:
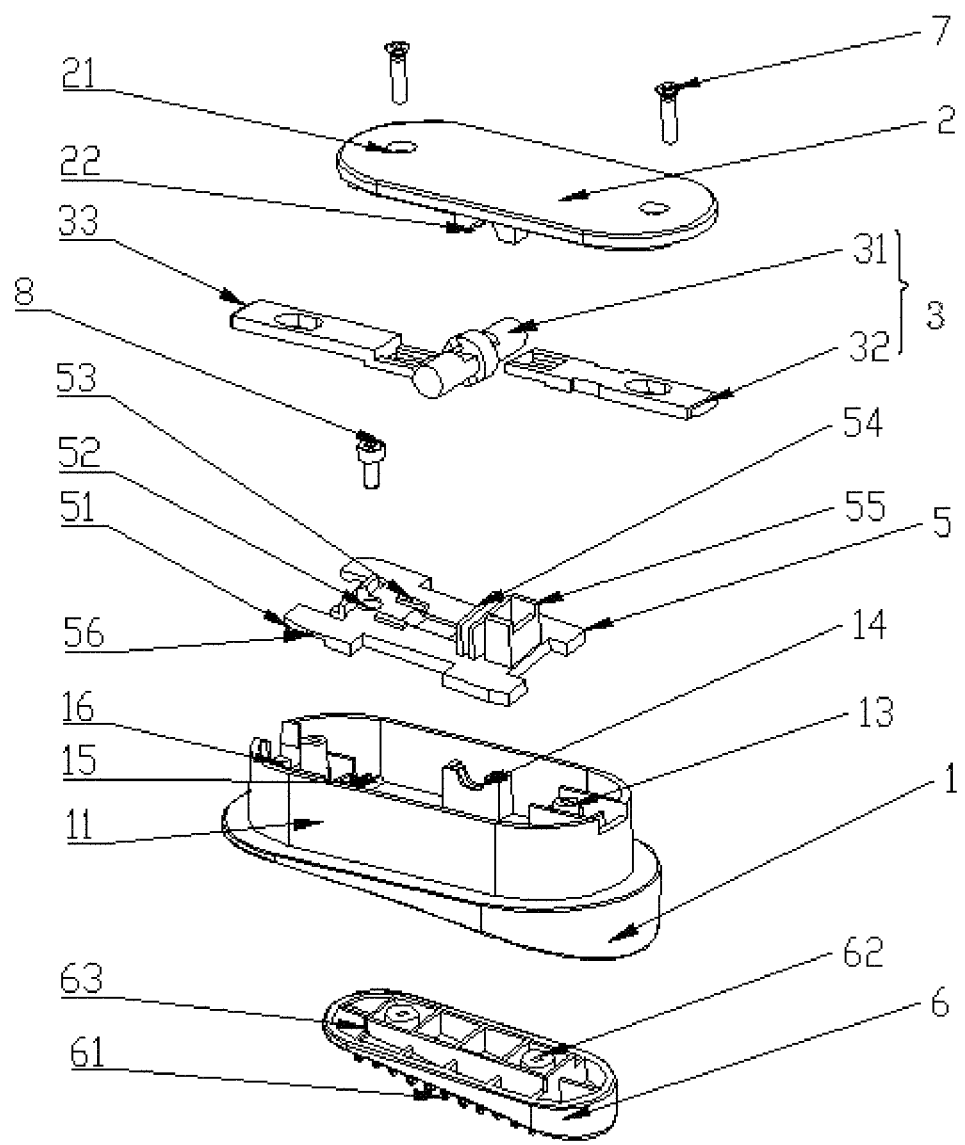
FIG. 1 is an exploded view of the first embodiment of the overall structure of the battery cover structure according to the present invention.

1 Main body 11 Main body stop 12 Strip-shaped protrusion and/or groove 13 Main body screw hole 14 Main body driving shaft connection 15 Main body clamping protrusion 16 Main body stop groove 17 Driving switch accommodating place 18 Elastic block accommodating groove 181 The lower half of the elastic block accommodating groove 18 182 The upper half of the elastic block accommodating groove 18

2 Upper cover 21 Upper cover screw hole 22 Upper cover driving shaft connection 23 Sliding stop connecting portion 3 Locking portion 31 Driving shaft 311 First connecting groove 312 Second connecting groove 313 Driving shaft connecting portion 3131 Driving shaft connecting portion groove 32 Driving stop 321 First connecting hole 322 Driving stop screw hole 323 Driving stop groove 3231 First groove wall 3232 Second groove wall 33 Sliding stop 331 Second connecting hole 332 Sliding stop screw hole 333 Sliding stop step 4 Ejection portion 41 Spring 42 Elastic block 421 Elastic block groove 422 Elastic block exterior 423 Elastic block interior 43 Elastic block screw hole 431 Elastic block screw hole 44 Elastic block stop fixing screw 5 Driving block 51 Driving block clamping protrusion 52 Driving block screw hole 53 Driving block protrusion 54 Driving block supporting plate 55 Driving block support frame 56 Clamping thin wall 6 Driving switch 61 Driving switch pressing key 62 Driving switch screw hole 63 Driving switch boss 7 Fixing screw 8 Internally fixed screw 9 Battery cover structure accommodating hole

DETAILED DESCRIPTION OF EMBODIMENTS

Hereinafter, the present invention will be described further with reference to the preferred embodiments and with reference to the accompanying drawings.

Embodiment 1

Figure 20:
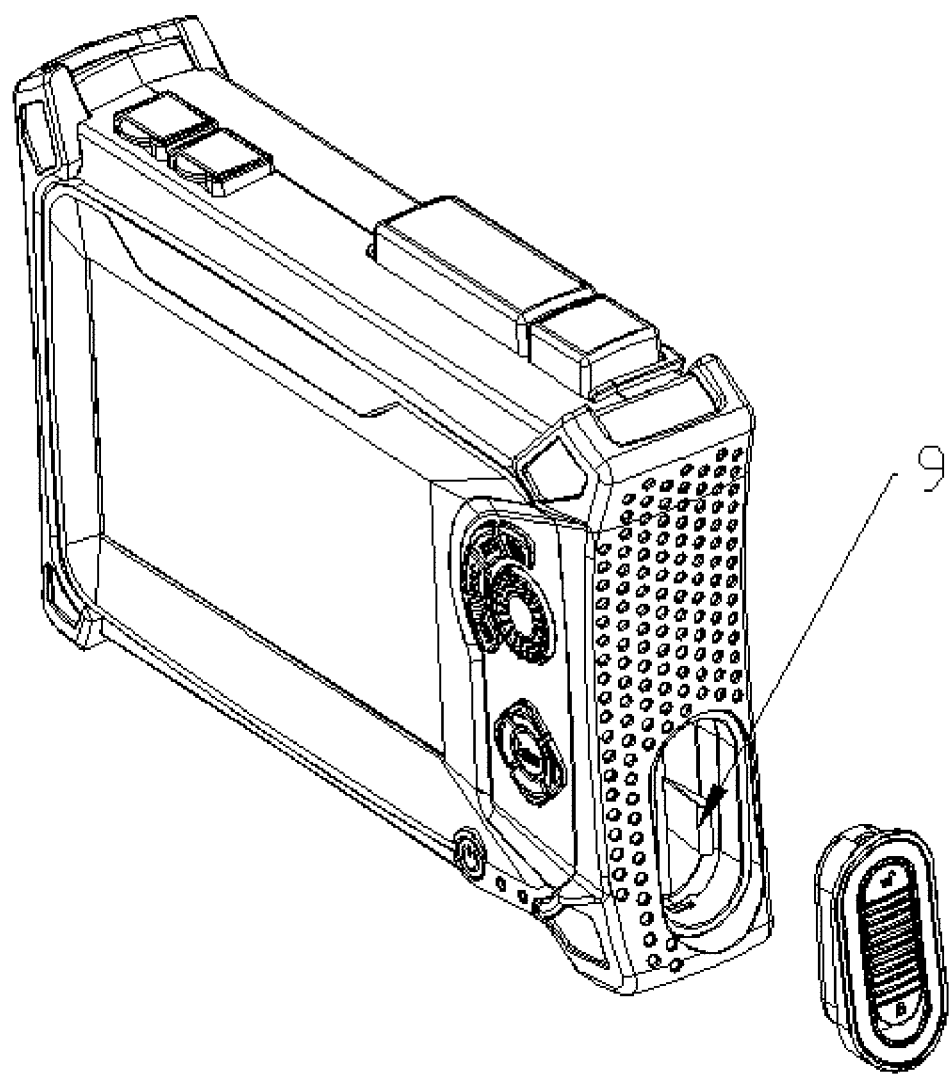
FIG. 20 is a schematic of the battery cover structure not assembled with the optical communication equipment according to the present invention.

As shown in FIG. 1 and FIG. 20, a battery cover structure for portable optical communication equipment comprises a shell and fixing screws 7, among which, the shell comprises a main body 1 and an upper cover 2, the fixing screws 7 connect the main body 1 with the upper cover 2, and the optical communication equipment is provided with a battery cover structure accommodating hole 9 for accommodating the battery cover structure.

The battery cover structure comprises an actuating device and a locking device, wherein the actuating device moves to drive the locking device into a locking state or an unlocking state;

The actuating device comprises a driving block 5, a driving stop 32 and a driving shaft 31, wherein the driving block 5 is limited and connected with the driving stop 32; the locking device comprises a sliding stop 33, and preferably, in this embodiment, the driving stop 32 is also a part of the locking device.

Preferably, the battery cover structure in this embodiment comprises a locking portion 3 which comprises a driving shaft 31, a driving stop 32 and a sliding stop 33.

The battery cover structure further comprises a driving switch 6 which comprises a driving switch pressing key 61, a driving switch screw hole 62, and a driving switch boss 63, and the driving switch boss 6 is fixedly connected to the driving block 5 through the main body 1. The arrangement of the driving switch 6 may also be replaced by: the lower end of the driving block 5 is provided with a fixing structure similar to a handle, and an operator can also bring the locking device into a locking state or an unlocking state through the fixing structure.

Specifically, the driving shaft 31 comprises a first connecting groove 311, a second connecting groove 312, a driving shaft connecting portion 313, and driving shaft connecting portion grooves 3131.

The driving stop 32 comprises a first connecting hole 321, driving stop screw holes 322 for passage of the fixing screws 7, driving stop grooves 323, a first groove wall 3231, and a second groove wall 3232.

The sliding stop 33 comprises a second connecting hole 331, sliding stop screw holes 332 for passage of the fixing screws 7, and a sliding stop step 333.

The first connecting groove 311 and the second connecting groove 312 are positioned on opposite sides of the driving shaft 31. The first connecting groove 311 is engaged with the first connecting hole 321 in a fitting manner, and the second connecting groove 312 is engaged with the second connecting hole 331 in a fitting manner; preferably, the first connecting hole 321 and the second connecting hole 331 are square, the first connecting groove 311 and the second connecting groove 312 are recessed in the driving shaft 31, and are adapted to the shapes of the first connecting hole 321 and the second connecting hole 331. When the first connecting hole 321 and the second connecting hole 331 are engaged with the first connecting groove 311 and the second connecting groove 312, respectively, the driving stop 32 and the sliding stop 33 are connected to the driving shaft 31.

Preferably, the driving shaft 31 is provided with a driving shaft connecting portion 313 protruding and surrounding the driving shaft 31, and the driving shaft connecting portion 313 is provided with driving shaft connecting portion grooves 3131 in a good fit with the first connecting hole 321 and the second connecting hole 331. In the present invention, the number of the driving shaft connecting portion groove 3131 provided is 2, and specifically, the driving shaft connecting portion grooves 3131 are recessed in the driving shaft connecting portion 313, and an internal notch groove is formed in the ring of the driving shaft connecting portion 313 for one edge of the first connecting hole 321 or the second connecting hole 331 to be embedded so as to make the driving stop 32 and the sliding stop 33 in firm connection with the driving shaft 31.

The driving stop 32 is provided with driving stop grooves 323 recessed toward the driving stop 32, to form a step portion perpendicular to the moving direction of the driving stop 32, and the step portion is specifically two steps, i.e. a first groove wall 3231 and a second groove wall 3232.

The sliding stop 33 is provided with a sliding stop step 333, and two sides of the sliding stop step 333 are respectively connected with a second connecting hole 331 and a sliding stop main body, and the sliding stop main body is slightly higher than the second connecting hole 331 to form the sliding stop step 333.

The driving stop screw hole 322 and the sliding stop screw hole 332 are used for accommodating the fixing screw 7, and the site of the driving stop screw hole 322 and the sliding stop screw hole 332 is larger than the fixing screw 7; and when the actuating device moves, the driving stop screw hole 322 and the sliding stop screw hole 332 can conveniently accommodate the fixing screw 7.

Figure 4:
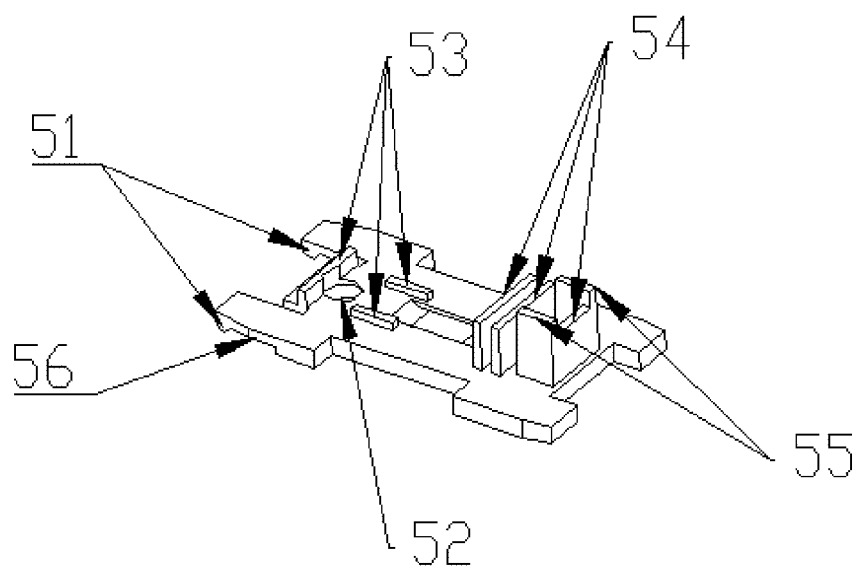
FIG. 4 is a structure drawing of the actuating portion of the battery cover structure according to the present invention.

As shown in FIG. 1 and FIG. 4, the driving block 5 comprises: a driving block clamping projection 51, a driving block hole 52 connected to the driving switch 6, a driving block projection 53 for supporting the sliding stop 33, a driving block supporting plate 54 for supporting the driving stop 32, a driving block support frame 55 connected to the driving stop, and a clamping thin wall 56.

As shown in FIG. 7 through FIG. 10, the driving block support frame 55 is connected to the driving block 32 in a variety of ways. Preferably, the driving stop grooves 323 are recessed in the driving stop 32 to form a step portion perpendicular to the moving direction of the driving stop; of course, it is conceivable that the driving stop grooves 323 may also be provided parallel to the moving direction of the stop, and correspondingly, the position of the support frame 55 is also adjusted by 90 degrees so as to be inserted into the driving stop grooves 323.

The following description will be given only with reference to the preferred driving block support frame 55 being engaged in the driving stop grooves 323 for flexible connection, and equivalents thereof will fall within the scope of the present invention and will not be described in detail herein.

The driving block support frame 55 is clamped into the driving stop grooves 323 and flexibly connected with them. When the driving block 5 moves, the driving block support frame 55 touches a first groove wall 3231 and a second groove wall 3232 of the driving stop grooves 323 to drive the driving stop 32 to move along with the driving block 5.

The driving block projection 53 is in contact with the lower plane of the sliding stop 33, the driving block supporting 54 plate is in contact with the lower plane of the driving stop 32, the driving block projection 52 and the driving block supporting plate 54 support the driving stop 32 and the sliding stop 33, so as to make the sliding stop 33 parallel to the driving stop 32 in the lengthwise direction.

Figure 6:
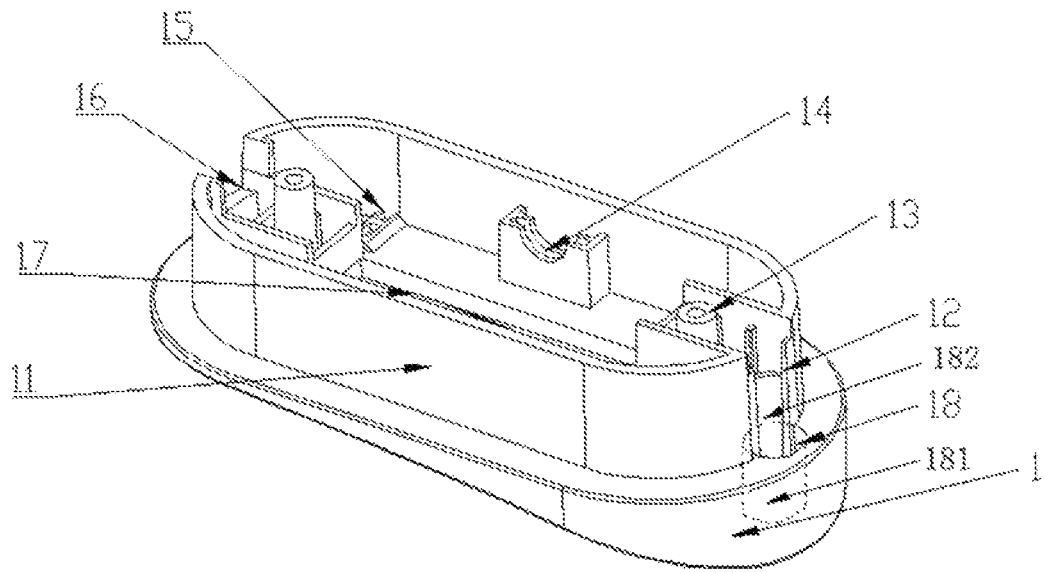
FIG. 6 is a structure drawing of the main body of the battery cover structure according to the present invention.
Figure 7:
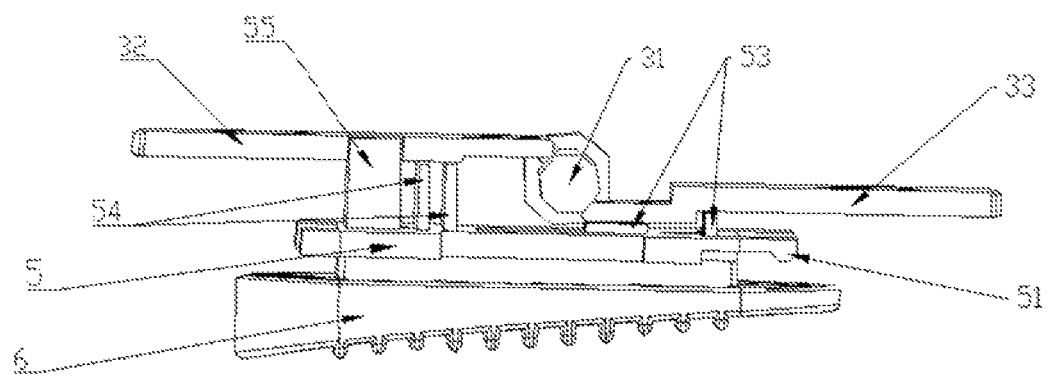
FIG. 7 is a lateral view of the battery cover structure in an unlocking state according to the present invention.
Figure 8:
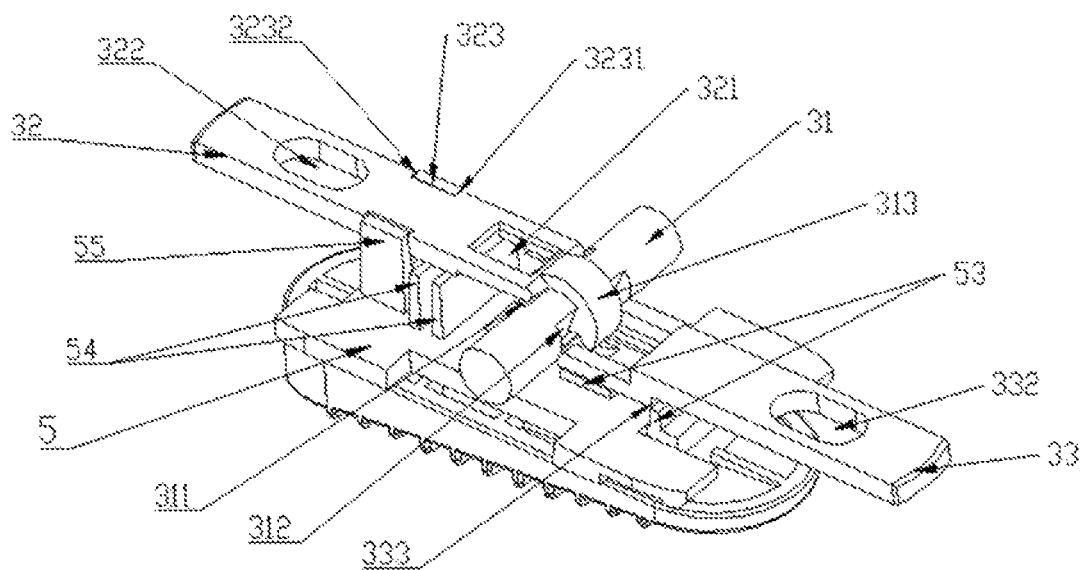
FIG. 8 is a top view of the battery cover structure in an unlocking state as shown in FIG. 7.

As shown in FIG. 1 and FIG. 6, the main body 1 comprises a main body stop 11 for shielding and protecting the actuating device, a main body screw hole 13 for the passage of the fixing screw 7, a main body driving shaft connection 14, a main body clamping projection 15 for mating connection with the driving portion, a main body stop groove 16 for supporting the end portion of the sliding stop 33 or the driving stop 32, as well as a driving switch accommodating place 17 for accommodating the driving switch 6.

The optical communication equipment is provided with a battery cover accommodating hole 9 for accommodating the battery cover structure, among which, the battery cover structure accommodating hole 9 is adapted to the main body stop 11.

The main body 1 is provided with a driving switch accommodating place 17, and the driving switch 6 is provided with a driving switch boss 63; the size of the driving switch accommodating place 17 is larger than that of the driving switch boss 63, and the driving switch boss 63 is inserted into the driving switch accommodating place 17 and moves back and forth in the driving switch accommodating place 17.

As shown in FIG. 4 and FIG. 6, the main body 1 is provided with a main body clamping projection 15, wherein the driving block clamping projection 51 can be flexibly connected with the main body clamping projection 15, and the clamping thin wall 56 is a deformable mechanism. Specifically, the driving switch 6 is fixedly connected to the driving portion 5, and when an external force is applied to the driving switch 6, the driving switch 6 is displaced in parallel within the range of the driving switch accommodating place 17 to drive the driving portion 5 to move in the same direction and distance.

The driving block clamping projection 51 is a slightly convex arc-shaped projection, and the main body clamping projection 15 protrudes from the bottom surface of the main said body 1 and has a concave shape inside. When the driving switch 6 is moved to a position close to the 15, the external force causes the driving block clamping projection 51 to generate a force in the direction of the main body clamping projection 15, and by slight deformation of the clamping thin wall 56, the driving block clamping projection 51 falls into the main body clamping projection 15, and the position of the driving portion 5 is relatively fixed; when the driving switch 6 is moved to a position away from the 15, the driving switch clamping projection 51 slides out of the main body clamping projection 15 under the action of an external force by slight deformation of the clamping thin wall 56, so that the driving portion 5 is relatively movable with respect to the position of the main body 1.

Figure 14:
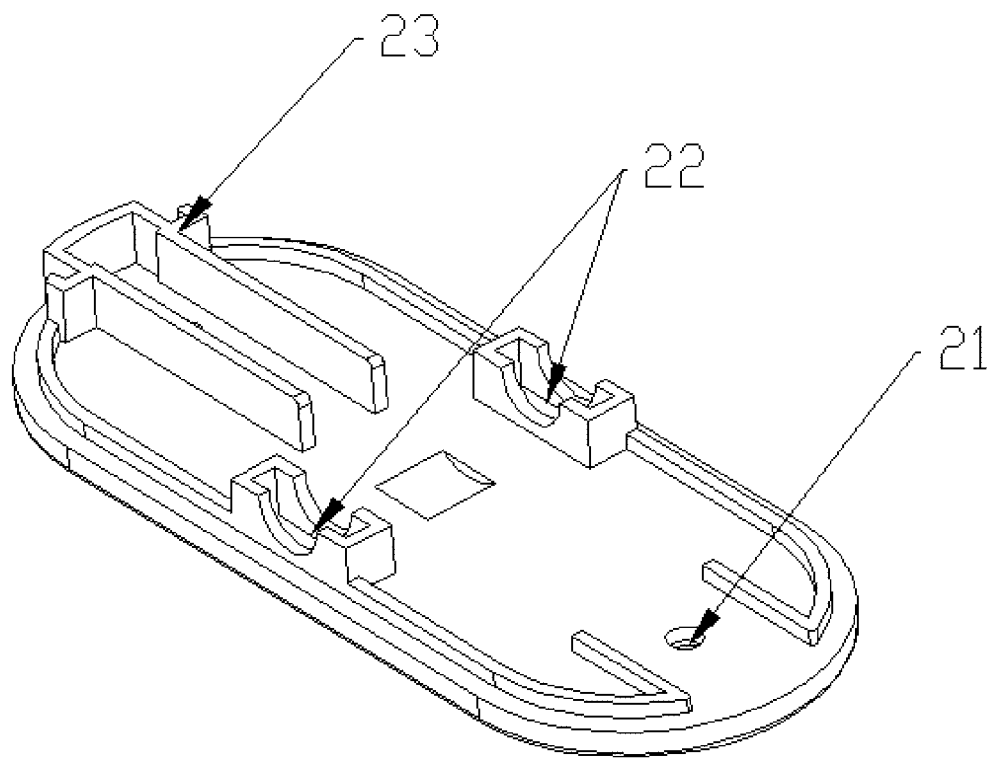
FIG. 14 is a structure drawing of the upper cover of the battery cover structure according to the present invention.

As shown in FIG. 1 and FIG. 14, the upper cover 2 comprises an upper cover screw hole 21, an upper cover driving shaft connection 22, and an abutting portion 23 to abut against the sliding 33.

The opposite sides of the main body 1 are provided with a main body driving shaft connection 14 for accommodating the driving shaft 31, and the main body driving shaft connection 14 is semicircular; correspondingly, the opposite sides of the upper cover 2 are provided with an upper cover driving shaft connection 22 for accommodating the driving shaft 31, and the upper cover driving shaft connection 22 is semicircular.

Specifically, when the upper cover 2 is closed and connected with the main body 1, the upper cover driving shaft connection 22 is in contact with and closed with the main body driving shaft connection 14 to form an annular circular hole, and the diameter of the annular circular hole is approximately equal to and slightly larger than the diameter of the driving shaft 31, and the driving shaft 31 is accommodated in the annular circular hole such that the position of the driving shaft 31 in the annular circular hole is fixed and rotatable.

During assembly, when the main body 1 and the upper cover 2 are closed, the fixing screw 7 sequentially passes through the upper cover screw hole 21, the driving stop screw hole 322 or the sliding stop screw hole 332, and the main body screw hole 13 from the upper cover 2 to the battery cover main body 1, and fixes the upper cover 2 and the locking portion 3 with the main body 1.

The driving portion 5 is fixedly connected with the driving switch 6 through an internal fixing screw 8, the length or width of the driving portion 5 is larger than that of the driving switch accommodating place 17, and the driving switch boss 63 of the driving switch 6 is accommodated in the driving switch accommodating place 17 so that the driving portion 5 and the driving switch 6 can only move in the horizontal direction of the main body 1, and be fixed in the vertical position.

As shown in FIG. 7 through FIG. 10, there are two states of the battery cover structure, namely, a locking state and an unlocking state, wherein the locking state is an operating state.

During operation, the battery cover structure changes from the unlocking state to the locking state, among which an actuating device inside the battery cover structure moves to drive the locking device into a locking state.

Figure 17:
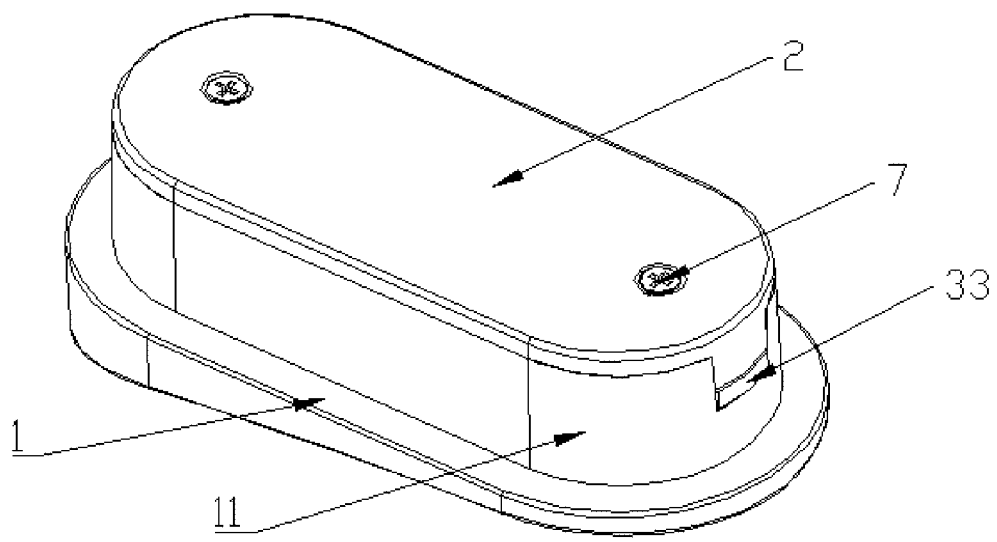
FIG. 17 is an outside view of the battery cover structure in an unlocking state according to the present invention.
Figure 18:
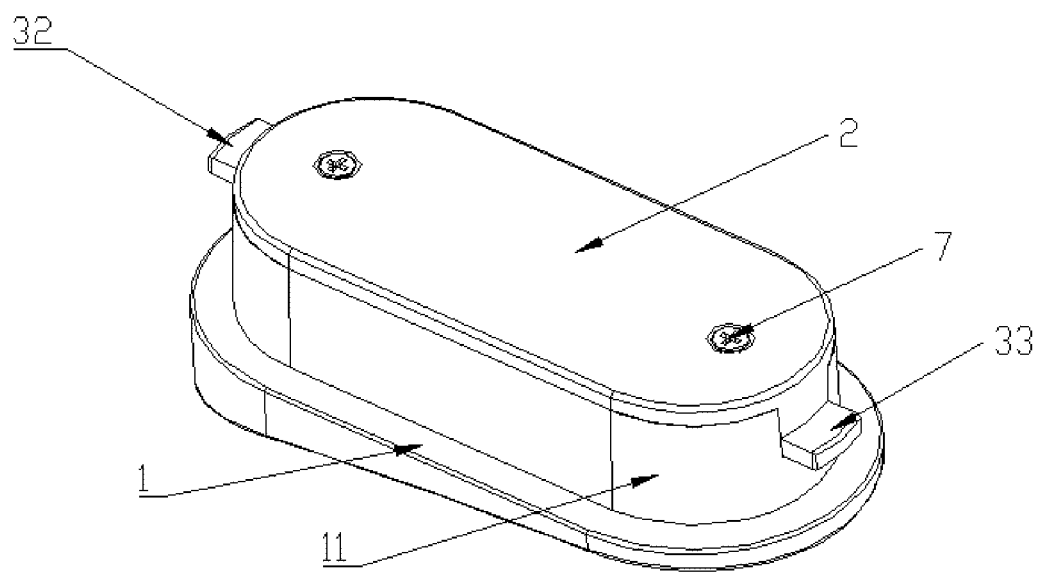
FIG. 18 is an outside view of the battery cover structure in a locking state according to the present invention.
Figure 19:
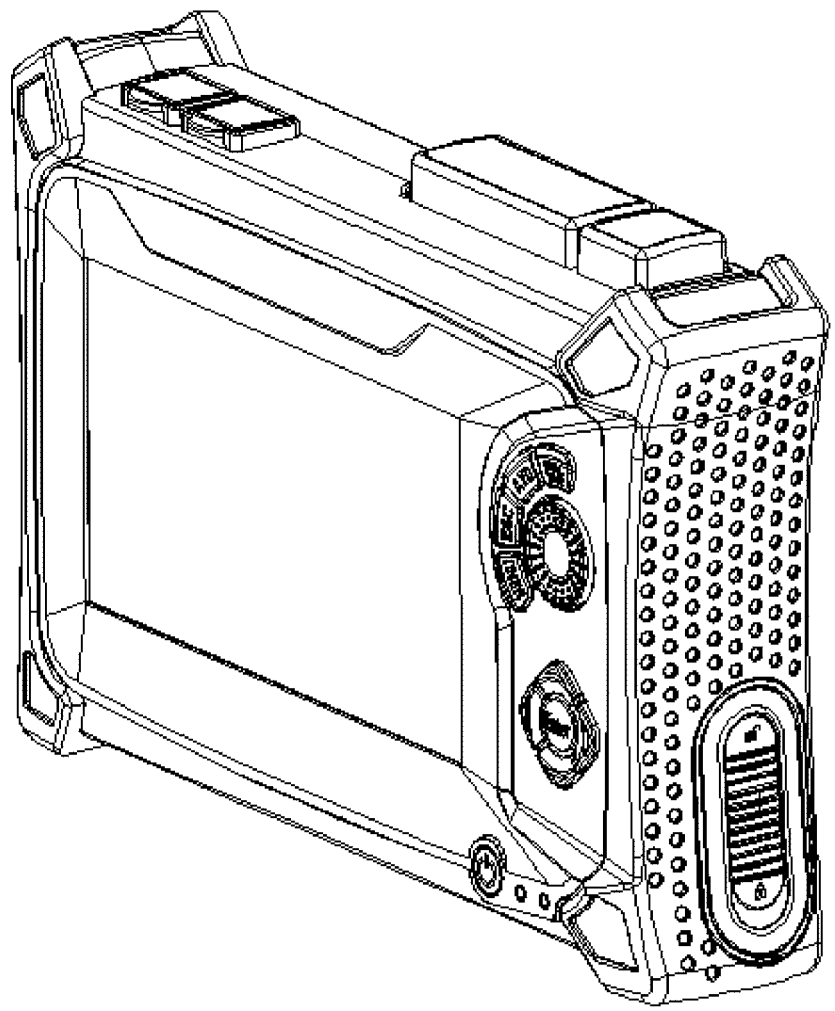
FIG. 19 is an outside view of the battery cover structure already assembled with the optical communication equipment according to the present invention; supply reference numbers after the complement of a figure

Specifically, when the battery cover structure is in the unlocking state, as shown in FIG. 17, the driving stop 32 and the sliding stop 33 are contracted in the main body 1, and edges of the driving stop 32 and the sliding stop 33 are in contact with the main body stop groove 16, at this time, the main body 1 of the battery cover structure presents a smooth curved surface.

When the battery cover structure moves from the unlocking state to the locking state, a driving switch 6 is slid, among which, the driving switch 6 is fixedly connected with the driving portion 5, the driving switch 6 changes in position under an external force, a force is started to be generated to the other side of the driving switch accommodating place 17, and the position of the driving portion 5 starts to move.

Under the continued action of an external force, the driving switch 6 drives the driving portion 5 to move, and the driving block support frame 55 on the driving portion 5 generates a force on a second groove wall 3232 of the driving stop grooves 323 on the driving stop 32 to drive the driving stop 32 to move.

Because the driving stop 32 is clamped with the driving shaft 31, when the position of the driving stop 32 changes, the driving shaft 31 is driven to rotate in an annular circular hole formed by the contact and closure of the upper cover driving shaft connection 22 and the main body driving shaft connection 14, and the driving shaft 31 is rotated to drive the sliding stop 33 clamped with the driving shaft 31 to start moving.

Since the driving stop 32 and the sliding stop 33 are respectively connected to opposite sides of the driving shaft 31, the moving distance of the driving stop 32 is the same as the distance by which the driving shaft 31 is driven to rotate and thereby the sliding stop 33 is driven to move.

When the edge of the driving switch 6 comes into contact with the other side of the driving switch accommodating place 17, the movement of the driving switch 6 ends, and at this time, the driving switch clamping projection 51 is engaged in the main body clamping projection 15 under the action of an external force, and the position of the driving portion 5 is fixed.

At this time, the edges of the driving stop 32 and the sliding stop 33 extend out of the main body stop 11 and cooperate with a reserved hole on the optical communication equipment so that the battery cover structure is fixed in the optical communication equipment, and at this point, the movement of the battery cover structure from the unlocking state to the locking state is finished, and the battery cover structure enters the locking state.

Correspondingly, when the battery cover structure moves from the locking state to the unlocking state, the driving switch 6 changes in position under an external force, a force is started to be generated to the other side of the driving switch accommodating place 17, and when the force reaches a certain degree, the driving switch clamping projection 51 slides out of the main body clamping projection 15 under the action of an external force, and the position of the driving portion 5 starts to move;

As with the aforementioned movement principle, under the continued action of an external force, the driving switch 6 drives the driving portion 5 to move, and the driving block support frame 55 on the driving portion 5 generates a force on a first groove wall 3231 of the driving stop grooves 323 on the driving stop 32 to drive the driving stop 32 to move.

The driving stop 32 drives the driving shaft 31 to rotate, thereby driving the sliding stop 33 to move.

When the edge of the driving switch 6 comes into contact with the other side of the driving switch accommodating place 17, the movement of the driving switch 6 ends. At this time, the driving stop 32 and the sliding stop 33 are contracted to the inside of the main body stop 11, retracted from a reserved hole in the optical communication equipment, so that the battery cover structure is not connected with the optical communication equipment. At this point, the movement of the battery cover structure from the locking state to the unlocking state is finished, and the battery cover structure enters the unlocking state.

Embodiment 2

Figure 2:
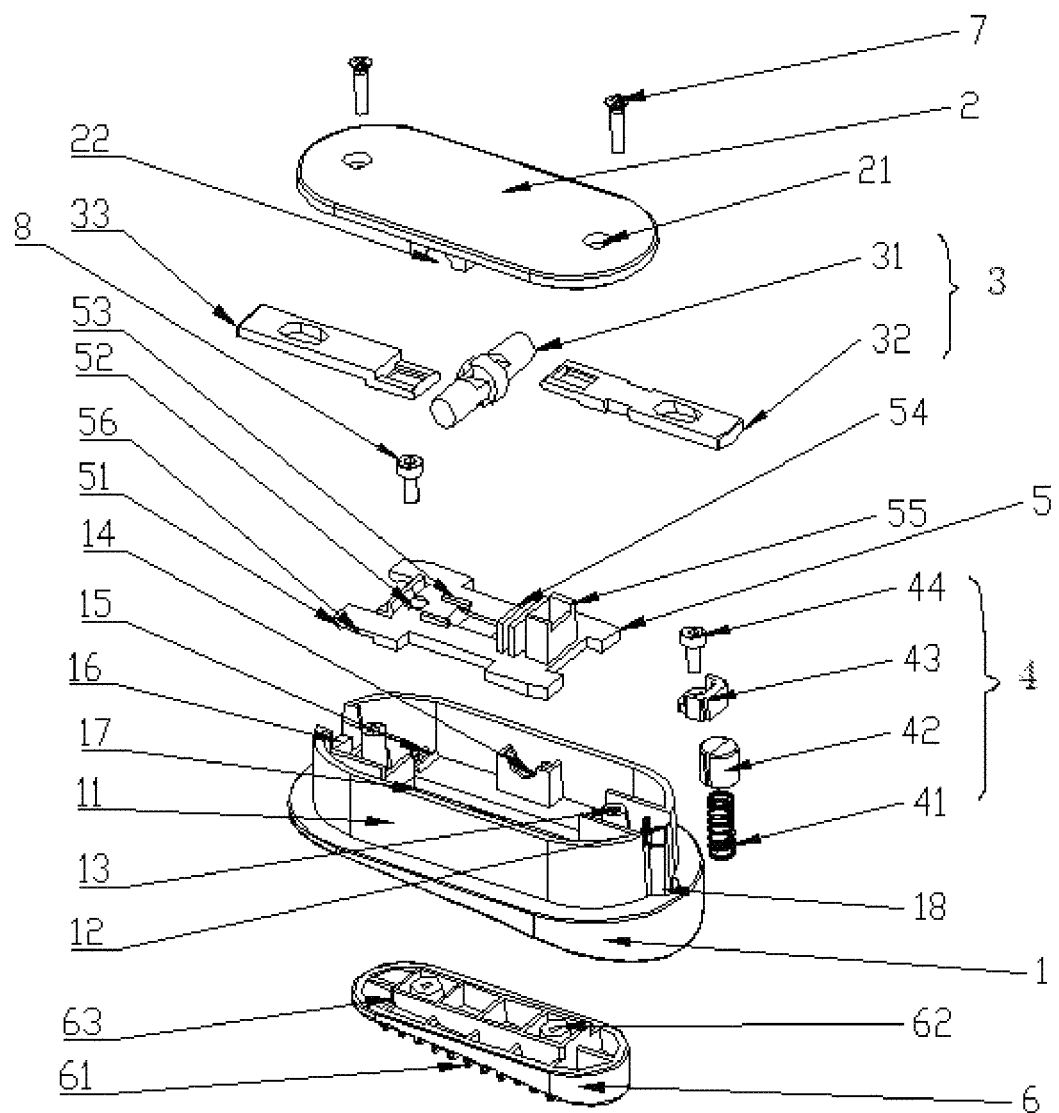
FIG. 2 is an exploded view of the second embodiment of the overall structure of the battery cover structure according to the present invention.
Figure 3:
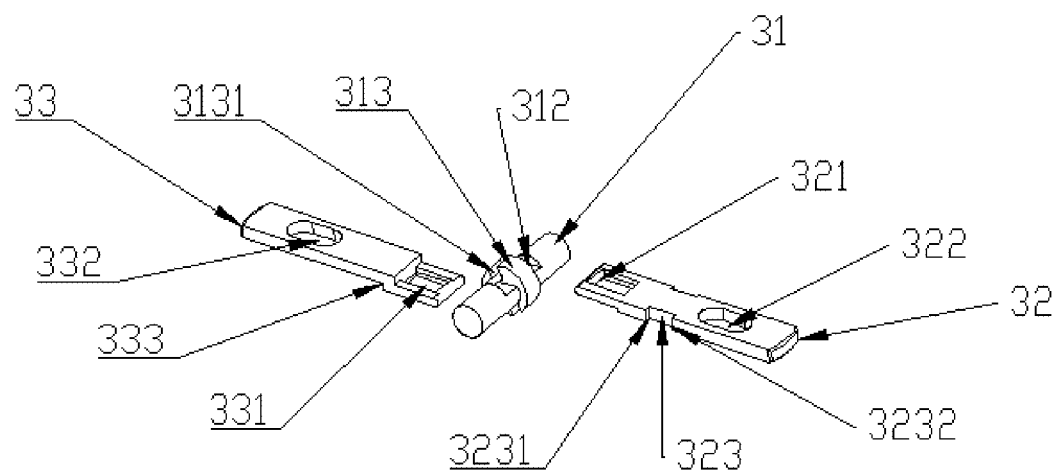
FIG. 3 is a structure drawing of the locking portion of the battery cover structure according to the present invention.

As shown in FIG. 2 and FIG. 20, a battery cover structure for portable optical communication equipment comprises a shell and fixing screws 7, among which, the shell comprises a main body 1 and an upper cover 2, the fixing screw 7 connects the main body 1 with the upper cover 2, and the optical communication equipment is provided with a battery cover structure accommodating hole 9 for accommodating the battery cover structure.

The battery cover structure comprises an actuating device and a locking device, wherein the actuating device moves to drive the locking device into a locking state or an unlocking state;

The actuating device comprises a driving block 5, a driving stop 32 and a driving shaft 31, wherein the driving block 5 is limited and connected with the driving stop 32; the locking device comprises a sliding stop 33, and preferably, in this embodiment, the driving stop 32 is also a part of the locking device.

Preferably, the battery cover structure in this embodiment comprises a locking portion 3 which comprises a driving shaft 31, a driving stop 32 and a sliding stop 33.

As shown in FIG. 2, FIG. 5, FIG. 16 and FIG. 17, one side edge of the main body 1 and the main body stop 11 is provided with an elastic block accommodating groove 18 having a cylindrical hole-like structure, and in the horizontal position, a part of the elastic block accommodating groove 18 is outside the main body stop 11, and in the vertical position, a lower half 181 of the elastic block accommodating groove 18 is recessed in the surface of the main body 1, and the elastic block accommodating groove 18 accommodates an ejection portion 4.

The ejection portion 4 comprises an elastic mechanism, preferably further comprising an elastic block stop 43, an elastic block stop fixing screw 44, and the elastic mechanism comprises an elastic block 42 and a spring 41, and the elastic mechanism is located between the main body 1 and the upper cover 2, when the battery cover structure is in an unlocking state, the elastic mechanism generates a force far away from the main body 1 and drives the battery cover structure to eject from the main body 1.

Preferably, the elastic block 42 is cylindrical for accommodating the spring 41, and the elastic block 42 is externally provided with an elastic block protrusion and/or groove 421; correspondingly, the elastic block accommodating groove 18 is provided with a strip-shaped protrusion and/or groove 12 in a fit with the elastic block projection and/or groove 421; the elastic block protrusion and/or groove 421 are/is adapted to be connected to each other with the strip-shaped protrusion and/or groove 12. Preferably, the elastic block protrusion 421 may be provided to be inserted into the strip-shaped groove 12 to fix the position of the elastic mechanism in the vertical direction.

Figure 5:
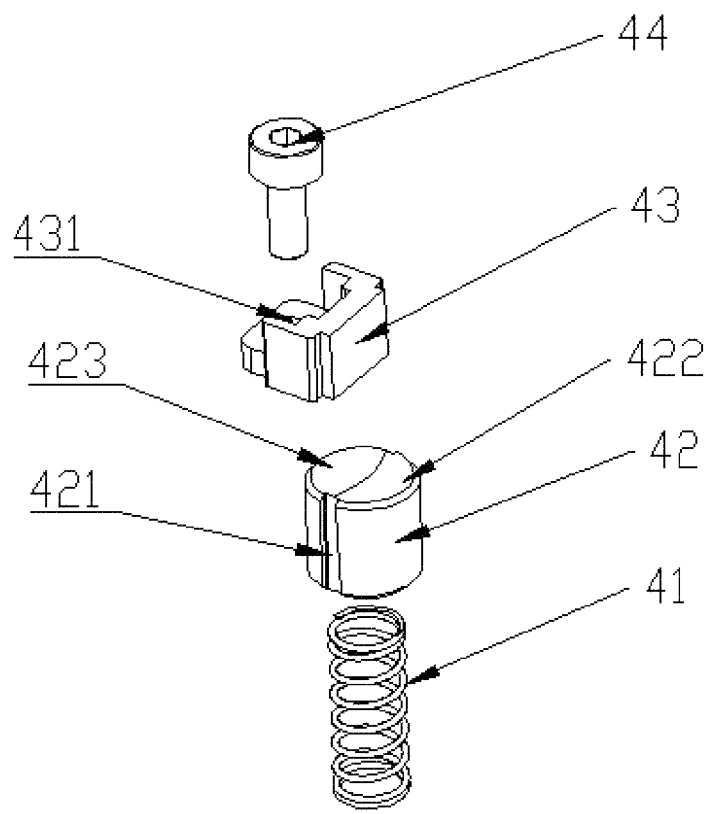
FIG. 5 is a structure drawing of the ejection portion of the battery cover structure according to the present invention.
Figure 15:
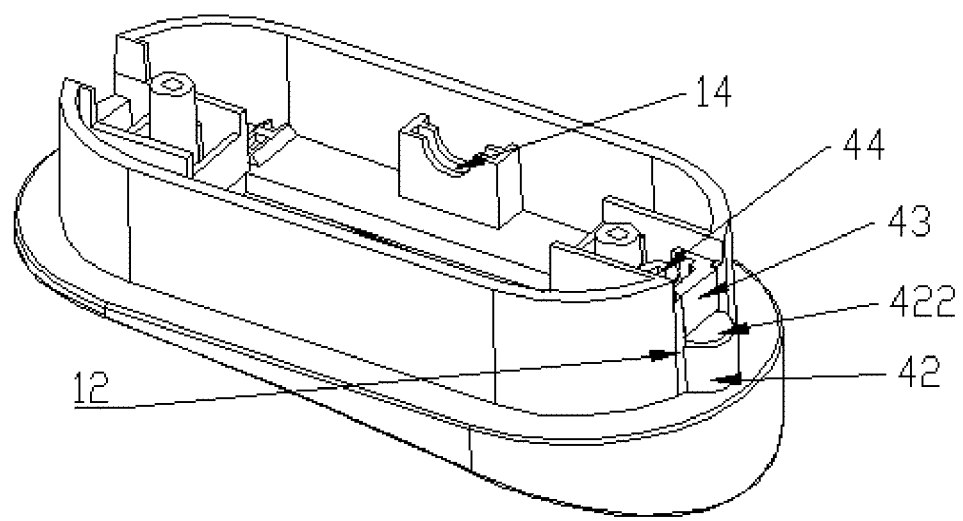
FIG. 15 is a schematic of the ejection mechanism in an ejection state of the battery cover structure according to the present invention.
Figure 16:
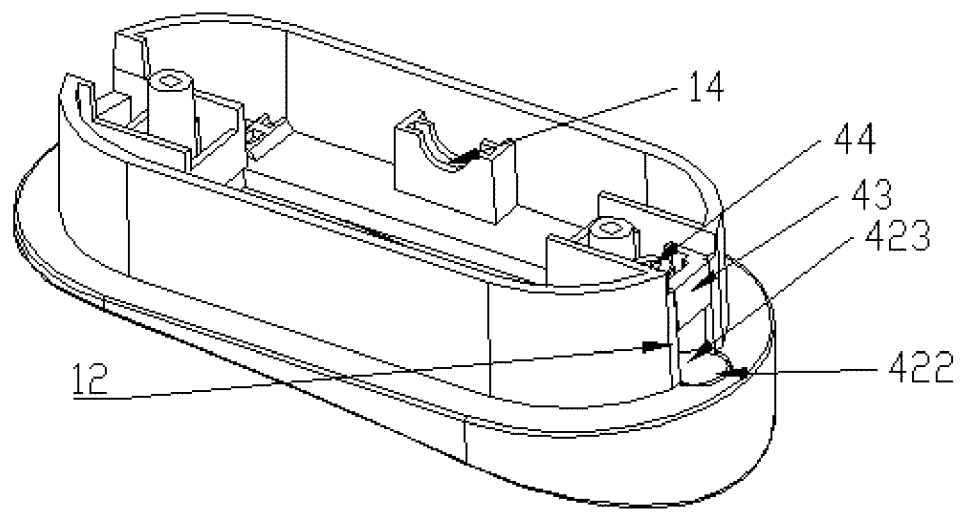
FIG. 16 is a schematic of the ejection mechanism in a constriction state of the battery cover structure according to the present invention.

As shown in FIG. 5, FIG. 15 and FIG. 16, the top portion of the elastic block 42 may be divided into an elastic block exterior 422 and an elastic block interior 423, which together form the top portion of the elastic block 42. After the assembly is completed, the elastic block 42 is located in the elastic block accommodating groove 18, and in the horizontal position, the elastic block exterior 422 is located outside the main body stop 11, and the elastic block interior 423 is located inside the main body stop 11. One end of the spring 41 is accommodated in the cylinder of the elastic block 42; and the other end is in contact with the main body 1. In this embodiment, the spring 1 falls into the elastic block accommodating groove 18 of the main body 1 and is fixed so that the other side of the spring can be telescopic and drive the main body 1 to move.

The elastic block stop 43 is positioned between the elastic mechanism and the upper cover 2, and is fixed with the main body 1 through the elastic block stop screw 44, and the elastic mechanism moves between the elastic block stop 43 and the bottom surface of the elastic block accommodating groove 18.

Specifically, the elastic block stop 43 is provided with an elastic block screw hole 431 for accommodating the elastic block stop fixing screw 44. In this embodiment, the elastic block stop fixing screw 44 is threaded through the elastic block screw hole 431 and screwed into the screw hole position on the main body 1, and fixes the elastic block stop 43 with the main body 1 so that the upper surface of the elastic mechanism is fixed in a horizontal position, while preventing the friction generated by the contact of the elastic block 42 with the driving stop 32 from affecting the projection of the driving stop 32 from the main body stop groove 16.

The spring 41 is fixed to the main body 1, and one end connected to the elastic block 42 is movable so that a force which is generated by the spring 41 to move the elastic block 42 away from the main body 1 always exists, and the elastic block stop 43 is in contact with the elastic block interior 423 at the top of the elastic block 42 so that the movable range of the elastic block 42 is between the lower edge of the elastic block stop 43 and the bottom surface of the elastic block accommodating groove 18.

The battery cover structure further comprises a driving switch 6 which comprises a driving switch pressing key 61, a driving switch screw hole 62, and a driving switch boss 63, and the driving switch boss 6 is fixedly connected to the driving block 5 through the main body 1. The arrangement of the driving switch 6 may also be replaced by: the lower end of the driving block 5 is provided with a fixing structure similar to a handle, and an operator can also bring the locking device into a locking state or an unlocking state through the fixing structure.

Preferably, the driving shaft 31 comprises a first connecting groove 311, a second connecting groove 312, a driving shaft connecting portion 313, and driving shaft connecting portion grooves 3131.

The driving stop 32 comprises a first connecting hole 321, driving stop screw holes 322 for passage of the fixing screws 7, driving stop grooves 323, a first groove wall 3231, and a second groove wall 3232.

The sliding stop 33 comprises a second connecting hole 331, sliding stop screw holes 332 for passage of the fixing screws 7, and a sliding stop step 333.

The first connecting groove 311 and the second connecting groove 312 are positioned on opposite sides of the driving shaft 31. The first connecting groove 311 is engaged with the first connecting hole 321 in a fitting manner, and the second connecting groove 312 is engaged with the second connecting hole 331 in a fitting manner; specifically, the first connecting hole 321 and the second connecting hole 331 are square, the first connecting groove 311 and the second connecting groove 312 are recessed in the driving shaft 31, and are matched with the shapes of the first connecting hole 321 and the second connecting hole 331. When the first connecting hole 321 and the second connecting hole 331 are engaged with the first connecting groove 311 and the second connecting groove 312, respectively, the driving stop 32 and the sliding stop 33 are connected to the driving shaft 31.

Preferably, the driving shaft 31 is provided with a driving shaft connecting portion protruding and surrounding the driving shaft 31, and the driving shaft connecting portion 313 is provided with driving shaft connecting portion grooves 3131 in a good fit with the first connecting hole 321 and the second connecting hole 331. In the present invention, the number of the driving shaft connecting portion groove 3131 provided is 2, and specifically, the driving shaft connecting portion grooves 3131 are recessed in the driving shaft connecting portion 313, and an internal notch groove is formed in the ring of the driving shaft connecting portion 313 for one edge of the first connecting hole 321 or the second connecting hole 331 to be embedded so as to make the driving stop 32 and the sliding stop 33 in firm connection with the driving shaft 31.

The driving stop 32 is provided with driving stop grooves 323 recessed toward the driving stop 32, to form a step portion perpendicular to the moving direction of the driving stop 32, and the step portion is specifically two steps, i.e. a first groove wall 3231 and a second groove wall 3232.

The sliding stop 33 is provided with a sliding stop step 333, and two sides of the sliding stop step 333 are respectively connected with a second connecting hole 331 and a sliding stop main body, and the sliding stop main body is slightly higher than the second connecting hole 331 to form the sliding stop step 333.

The driving stop screw hole 322 and the sliding stop screw hole 332 are used for accommodating the fixing screw 7, and the site of the driving stop screw hole 322 and the sliding stop screw hole 332 is larger than the fixing screw 7; and when the actuating device moves, the driving stop screw hole 322 and the sliding stop screw hole 332 can conveniently accommodate the fixing screw 7.

As shown in FIG. 2 and FIG. 4, the driving block 5 comprises: a driving block clamping projection 51, a driving block hole 52 connected to the driving switch 6, a driving block projection 53 for supporting the sliding stop 33, a driving block supporting plate 54 for supporting the driving stop 32, a driving block support frame 55 connected to the driving stop, and a clamping thin wall 56.

As shown in FIG. 7 through FIG. 10, the driving block support frame 55 is connected to the driving block 32 in a variety of ways. Preferably, the driving stop groove 323 is recessed in the driving stop 32 to form a step portion perpendicular to the moving direction of the driving stop; of course, it is conceivable that the driving stop grooves 323 may also be provided parallel to the moving direction of the stop, and correspondingly, the position of the support frame 55 is also adjusted by 90 degrees so as to be inserted into the driving stop grooves 323.

The following description will be given only with reference to the preferred driving block support frame 55 being engaged in the driving stop grooves 323 for flexible connection, and equivalents thereof will fall within the scope of the present invention and will not be described in detail herein.

The driving block support frame 55 is clamped into the driving stop grooves 323 and flexibly connected with them. When the driving block 5 moves, the driving block support frame 55 touches a first groove wall 3231 and a second groove wall 3232 of the driving stop grooves 323 to drive the driving stop 32 to move along with the driving block 5.

The driving block projection 53 is in contact with the lower plane of the sliding stop 33, the driving block supporting 54 plate is in contact with the lower plane of the driving stop 32, the driving block projection 52 and the driving block supporting plate 54 support the driving stop 32 and the sliding stop 33, so as to make the sliding stop 33 parallel to the driving stop 32 in the lengthwise direction.

As shown in FIG. 2 and FIG. 6, the main body 1 comprises a main body stop 11 for shielding and protecting the actuating device, a main body screw hole 13 for the passage of the fixing screw 7, a main body driving shaft connection 14, a main body clamping projection 15 for mating connection with the driving portion, a main body stop groove 16 for supporting the end portion of the sliding stop 33 or the driving stop 32, as well as a driving switch accommodating place 17 for accommodating the driving switch 6.

The optical communication equipment is provided with a battery cover accommodating hole 9 for accommodating the battery cover structure, among which, the battery cover structure accommodating hole 9 is adapted to the main body stop 11.

The main body 1 is provided with a driving switch accommodating place 17, and the driving switch 6 is provided with a driving switch boss 63; the size of the driving switch accommodating place 17 is larger than that of the driving switch boss 63, and the driving switch boss 63 is inserted into the driving switch accommodating place 17 and moves back and forth in the driving switch accommodating place 17.

As shown in FIG. 4 and FIG. 6, the main body 1 is provided with a main body clamping projection 15, wherein the driving block clamping projection 51 can be flexibly connected with the main body clamping projection 15, and the clamping thin wall 56 is a deformable mechanism.

Specifically, the driving switch 6 is fixedly connected to the driving portion 5, and when an external force is applied to the driving switch 6, the driving switch 6 is displaced in parallel within the range of the driving switch accommodating place 17 to drive the driving portion 5 to move in the same direction and distance.

The driving block clamping projection 51 is a slightly convex arc-shaped projection, and the main body clamping projection 15 protrudes from the bottom surface of the main said body 1 and has a concave shape inside. When the driving switch 6 is moved to a position close to the 15, the external force causes the driving block clamping projection 51 to generate a force in the direction of the main body clamping projection 15, and by slight deformation of the clamping thin wall 56, the driving block clamping projection 51 falls into the main body clamping projection 15, and the position of the driving portion 5 is relatively fixed; when the driving switch 6 is moved to a position away from the 15, the driving switch clamping projection 51 slides out of the main body clamping projection 15 under the action of an external force by slight deformation of the clamping thin wall 56, so that the driving portion 5 is relatively movable with respect to the position of the main body 1.

As shown in FIG. 2 and FIG. 14, the upper cover 2 comprises an upper cover screw hole 21, an upper cover driving shaft connection 22, and an abutting portion 23 to abut against the sliding 33.

The opposite sides of the main body 1 are provided with a main body driving shaft connection 14 for accommodating the driving shaft 31, and the main body driving shaft connection 14 is semicircular; correspondingly, the opposite sides of the upper cover 2 are provided with an upper cover driving shaft connection 22 for accommodating the driving shaft 31, and the upper cover driving shaft connection 22 is semicircular.

Specifically, when the upper cover 2 is closed and connected with the main body 1, the upper cover driving shaft connection 22 is in contact with and closed with the main body driving shaft connection 14 to form an annular circular hole, and the diameter of the annular circular hole is approximately equal to and slightly larger than the diameter of the driving shaft 31, and the driving shaft 31 is accommodated in the annular circular hole such that the position of the driving shaft 31 in the annular circular hole is fixed and rotatable.

During assembly, when the main body 1 and the upper cover 2 are closed, the fixing screw 7 sequentially passes through the upper cover screw hole 21, the driving stop screw hole 322 or the sliding stop screw hole 332, and the main body screw hole 13 from the upper cover 2 to the battery cover main body 1, and fixes the upper cover 2 and the locking portion 3 with the main body 1.

The driving portion 5 is fixedly connected with the driving switch 6 through an internal fixing screw 8, the length or width of the driving portion 5 is larger than that of the driving switch accommodating place 17, and the driving switch boss 63 of the driving switch 6 is accommodated in the driving switch accommodating place 17 so that the driving portion 5 and the driving switch 6 can only move in the horizontal direction of the main body 1, and be fixed in the vertical position.

As shown in FIG. 7 through FIG. 10, FIG. 15 and FIG. 16, there are two states of the battery cover structure, namely, a locking state and an unlocking state, wherein the locking state is an operating state.

During operation, the battery cover structure changes from the unlocking state to the locking state, among which an actuating device inside the battery cover structure moves to drive the locking device into a locking state.

Figure 9:
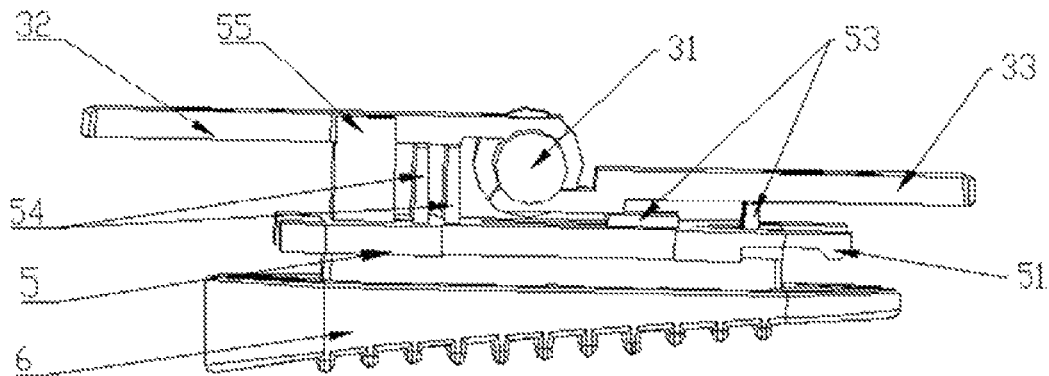
FIG. 9 is a lateral view of the battery cover structure in a locking state according to the present invention.
Figure 10:
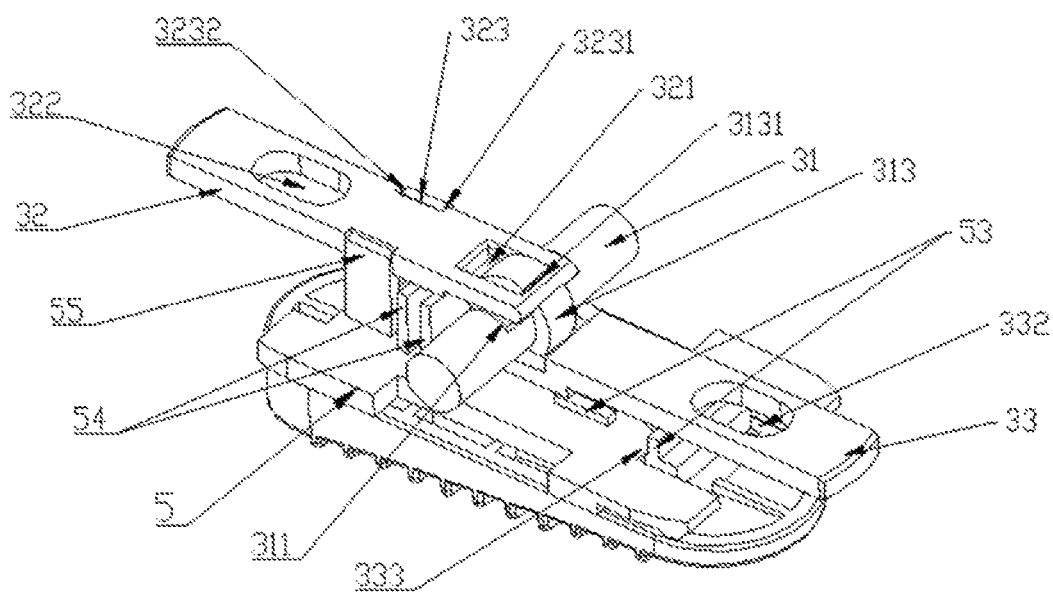
FIG. 10 is a top view of the battery cover structure in a locking state as shown in FIG. 9.
Figure 11:
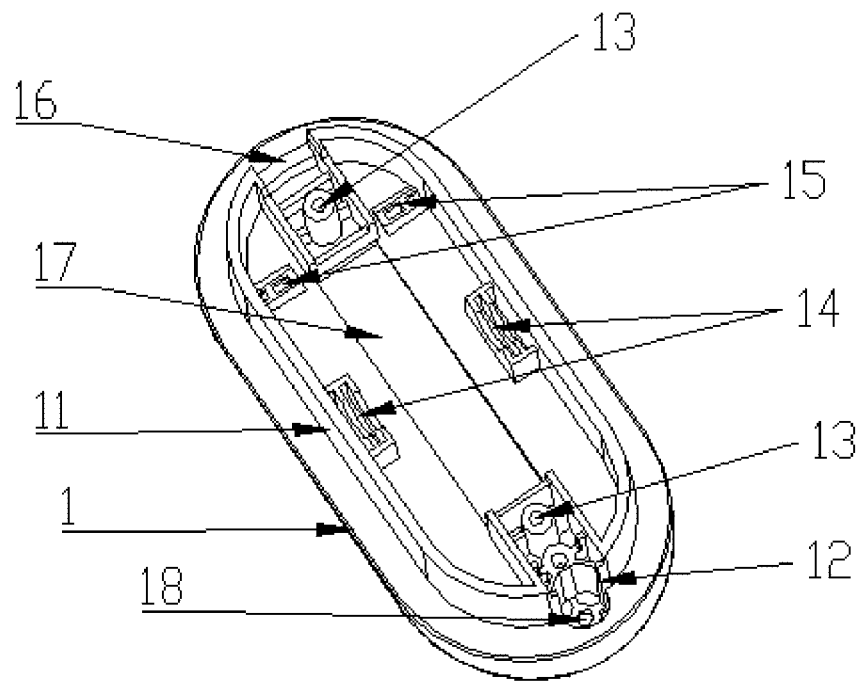
FIG. 11 is a structure drawing of the main body of the battery cover structure according to the present invention.
Figure 12:
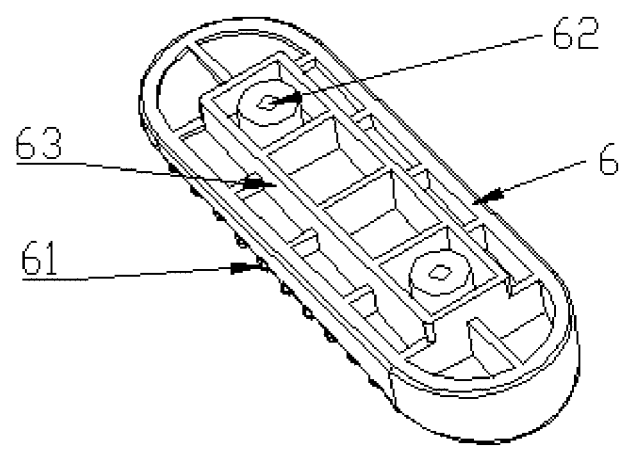
FIG. 12 is a structure drawing of the driving switch of the battery cover structure according to the present invention.
Figure 13:
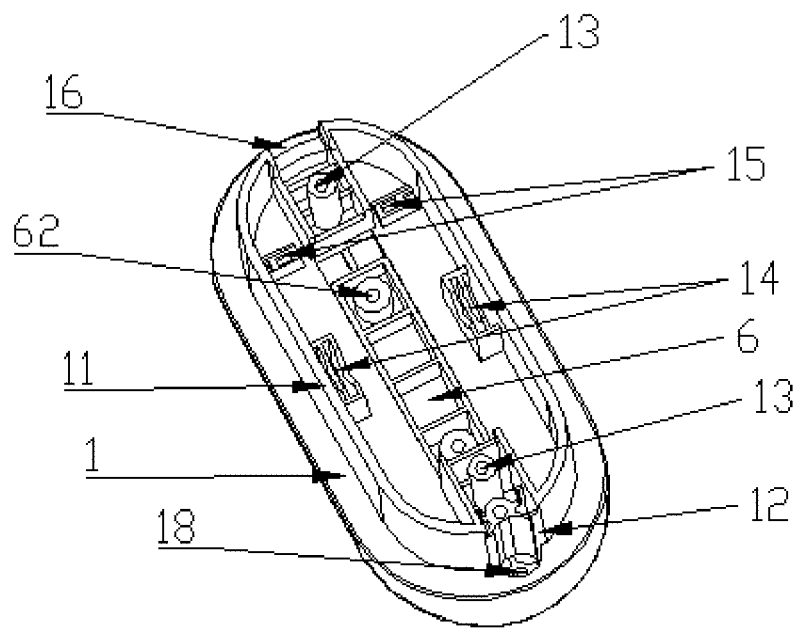
FIG. 13 is a structure drawing of the connection between the driving switch and the main body of the battery cover structure according to the present invention.

Specifically, when the battery cover structure is in the unlocking state, as shown in FIG. 17, FIG. 9 and FIG. 15, the battery cover structure has following states: The driving stop 32 and the sliding stop 33 are contracted in the main body 1, and edges of the driving stop 32 and the sliding stop 33 are in contact with the main body stop groove 16. The elastic block 42 has ejected out of the circular hole of the lower half 181 of the elastic block accommodating groove 18 under the tension of the spring 41, and the elastic block interior 423 at the top of the elastic block 42 is in contact with the lower edge of the elastic block stop 43. At this time, the main body stop 11 of the battery cover structure is mostly in a smooth curved surface, and the elastic block exterior 422 of the elastic block 42 is located outside the main body stop 11.

When the battery cover structure moves from the unlocking state to the locking state, the battery cover main body is firstly pressed into the battery cover structure accommodating hole 9 preset by the optical communication equipment, after the battery cover structure accommodating hole 9 is matched with the edge of the main body stop 11, and the elastic block exterior 422 contacts the battery cover structure accommodating hole 9, the elastic mechanism is pressed and contracted as shown in FIG. 6 and is accommodated in the circular hole of the lower half 181 of the elastic block accommodating groove 18.

A driving switch 6 is slid, among which, the driving switch 6 is fixedly connected with the driving portion 5, the driving switch 6 changes in position under an external force, a force is started to be generated to the other side of the driving switch accommodating place 17, and the position of the driving portion 5 starts to move.

Under the continued action of an external force, the driving switch 6 drives the driving portion 5 to move, and the driving block support frame 55 on the driving portion 5 generates a force on a second groove wall 3232 of the driving stop grooves 323 on the driving stop 32 to drive the driving stop 32 to move;

Because the driving stop 32 is clamped with the driving shaft 31, when the position of the driving stop 32 changes, the driving shaft 31 is driven to rotate in an annular circular hole formed by the contact and closure of the upper cover driving shaft connection 22 and the main body driving shaft connection 14, and the driving shaft 31 is rotated to drive the sliding stop 33 clamped with the driving shaft 31 to start moving.

Since the driving stop 32 and the sliding stop 33 are respectively connected to opposite sides of the driving shaft 31, the moving distance of the driving stop 32 is the same as the distance by which the driving shaft 31 is driven to rotate and thereby the sliding stop 33 is driven to move.

When the edge of the driving switch 6 comes into contact with the other side of the driving switch accommodating place 17, the movement of the driving switch 6 ends, and at this time, the driving switch clamping projection 51 is engaged in the main body clamping projection 15 under the action of an external force, and the position of the driving portion 5 is fixed.

At this time, the edges of the driving stop 32 and the sliding stop 33 extend out of the main body stop 11 and cooperate with a reserved hole on the optical communication equipment so that the battery cover structure is fixed in the optical communication equipment, and at this point, the movement of the battery cover structure from the unlocking state to the locking state is finished, and the battery cover structure enters the locking state.

Correspondingly, when the battery cover structure moves from the locking state to the unlocking state, the driving switch 6 changes in position under an external force, a force is started to be generated to the other side of the driving switch accommodating place 17, and when the force reaches a certain degree, the driving switch clamping projection 51 slides out of the main body clamping projection 15 under the action of an external force, and the position of the driving portion 5 starts to move.

As with the aforementioned movement principle, under the continued action of an external force, the driving switch 6 drives the driving portion 5 to move, and the driving block support frame 55 on the driving portion 5 generates a force on a first groove wall 3231 of the driving stop grooves 323 on the driving stop 32 to drive the driving stop 32 to move.

The driving stop 32 drives the driving shaft 31 to rotate, thereby driving the sliding stop 33 to move.

When the edge of the driving switch 6 comes into contact with the other side of the driving switch accommodating place 17, the movement of the driving switch 6 ends. At this time, the driving stop 32 and the sliding stop 33 are contracted to the inside of the main body stop 11, retracted from a reserved hole in the optical communication equipment, so that the battery cover structure is not connected with the optical communication equipment.

At this time, the tension of the spring 41 starts to generate a force to drive the elastic block 42 to generate a force away from the battery cover structure accommodating hole 9, and the elastic block exterior 422 is provided outside the main body stop 11. Under the force, the elastic block exterior 422 starts to generate a force away from the battery cover structure accommodating hole 9, and the force of the spring 41 is continuously increased. The elastic block 42 is ejected from the lower half 181 of the elastic block accommodating groove 18 to drive one side of the battery cover structure out of the battery cover structure accommodating hole 9, thereby facilitating the removal of the battery cover structure from the battery cover structure accommodating hole 9.

At this point, the movement of the battery cover structure from the locking state to the unlocking state is finished, and the battery cover structure enters the unlocking state.

The above has been described in detail with respect to the specific embodiments of the present invention. It will be apparent to those skilled in the art that various modifications and adaptations may be made to the present invention without departing from the principles of the invention, which are also intended to be within the scope of the appended claims.

What is claimed is:

1. A battery cover structure for portable optical communication equipment, comprising:
a shell comprising a main body and an upper cover;
fixing screws;
an actuating device; and
a locking device,
wherein:
the actuating device moves to drive the locking device into a locking state or an unlocking state;
the actuating device comprises a driving block, a driving stop, and a driving shaft, and the driving block is limited and connected with the driving stop;
the locking device comprises a sliding stop; and
both the driving stop and the sliding stop are connected with the driving shaft,
wherein:
the driving shaft comprises a first connecting groove and a second connecting groove, the driving stop comprises a first connecting hole;
the sliding stop comprises a second connecting hole, and the first connecting groove is engaged with the first connecting hole in a fitting manner, and the second connecting groove is engaged with the second connecting hole in a fitting manner;

the first connection groove and the second connection groove are positioned on opposite sides of the driving shaft.

2. A battery cover structure for portable optical communication equipment according to claim 1, wherein:

the driving shaft is provided with a driving shaft connecting portion protruding and surrounding the driving shaft, and the driving shaft connecting portion is provided with driving shaft connecting portion grooves in a good fit with the first connecting hole and the second connecting hole.

3. A battery cover structure for portable optical communication equipment according to claim 1, wherein:

the driving block comprises a support frame;

the driving stop is provided with a driving stop connecting portion which is matched and connected with the support frame;

the support frame is clamped into the driving stop connecting portion and flexibly connected with it; when the driving block moves, the support frame touches the driving stop connecting portion to drive the driving stop to move along with the driving block.

4. A battery cover structure for portable optical communication equipment according to claim 3, wherein:

the driving stop connecting portion comprises driving stop grooves, among which, the driving stop grooves are sunk in the driving stop to form a step portion perpendicular to the moving direction of the driving stop;

the support frame is clamped into the driving stop grooves and flexibly connected with them, when the driving block moves, the support frame touches the step portion to drive the driving stop to move along with the driving block.

5. A battery cover structure for portable optical communication equipment according to claim 3, wherein:

the driving block is provided with a driving block projection for supporting the sliding stop and a driving block supporting plate for supporting the driving stop;

the driving block projection is in contact with the lower plane of the sliding stop, the driving stop supporting plate is in contact with the lower plane of the driving stop, and the sliding stop is parallel to the driving stop.

6. A battery cover structure for portable optical communication equipment according to claim 5, further comprising:

a driving switch, and the driving switch is fixedly connected with the driving block.

7. A battery cover structure for portable optical communication equipment according to claim 6, wherein:

the main body is provided with a driving switch accommodating place, and the driving switch is provided with a driving switch boss; the size of the driving switch accommodating place is larger than that of the driving switch boss, and the driving switch boss is inserted into the driving switch accommodating place and moves back and forth in the driving switch accommodating place.

8. A battery cover structure for portable optical communication equipment according to claim 7, wherein:

the driving block is provided with a driving block clamping projection and a clamping thin wall, wherein the clamping thin wall is a deformable mechanism;

the main body is provided with a main body clamping projection, wherein the driving block clamping projection can be flexibly connected with the main body clamping projection.

9. A battery cover structure for portable optical communication equipment according to claim 8, wherein:

the main body is provided with a main body driving shaft connection for accommodating the driving shaft, and the main body driving shaft connection is semicircular;

the upper cover is provided with an upper cover driving shaft connection for accommodating the driving shaft, and the upper cover driving shaft connection is semicircular;

when the upper cover is closed and connected with the main body, the upper cover driving shaft connection is in contact with and closed with the main body driving shaft connection to form an annular circular hole, and the driving shaft is accommodated in the annular circular hole.

10. A battery cover structure for portable optical communication equipment according to claim 9, wherein:

the main body is also provided with a plurality of main body stop grooves through which the locking device protrudes when the locking device enters a locking state.

11. A battery cover structure for portable optical communication equipment according to claim 10, wherein:

the main body is provided with a main body stop and the actuating device is accommodated in the main body stop.

12. A portable optical communication equipment, comprising a battery cover structure according to claim 1.

* * * * *